US006733926B2

(12) United States Patent
Muffoletto et al.

(10) Patent No.: US 6,733,926 B2
(45) Date of Patent: *May 11, 2004

(54) ELECTROCHEMICAL CELL HAVING A PHYSICAL VAPOR DEPOSITED ELECTRODE AND METHOD OF MANUFACTURE

(75) Inventors: Barry C. Muffoletto, Alden, NY (US); Ashish Shah, East Amherst, NY (US); Neal N. Nesselbeck, Lockport, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 336 days.

This patent is subject to a terminal disclaimer.

(21) Appl. No.: 10/016,210

(22) Filed: Dec. 12, 2001

(65) Prior Publication Data

US 2002/0041997 A1 Apr. 11, 2002

Related U.S. Application Data

(62) Division of application No. 09/498,667, filed on Feb. 7, 2000, now Pat. No. 6,332,900.
(60) Provisional application No. 60/118,977, filed on Feb. 8, 1999.

(51) Int. Cl.$^7$ ................................. H01M 4/72
(52) U.S. Cl. ..................... 429/233; 429/241; 429/242; 429/245; 429/231.95; 429/231.8; 429/231.7; 429/231.5
(58) Field of Search ................. 429/233, 241, 429/242, 245, 231.95, 231.8, 231.7, 231.5, 223, 224, 221, 220, 219

(56) References Cited

U.S. PATENT DOCUMENTS

| 5,376,475 A | 12/1994 | Ovshinsky et al. |
| 5,549,931 A | 8/1996 | Dattatraya et al. |
| 5,569,558 A | * 10/1996 | Takeuchi et al. ............ 429/122 |
| 5,576,925 A | 11/1996 | Gorowitz et al. |
| 5,616,429 A | * 4/1997 | Klementowski ............... 429/3 |
| 5,702,970 A | 12/1997 | Choi |
| 5,716,422 A | 2/1998 | Muffoletto et al. |
| 6,110,622 A | 8/2000 | Frysz et al. |

FOREIGN PATENT DOCUMENTS

| EP | 0 446 584 A1 | 9/1991 |
| EP | 0 582 844 A1 | 7/1993 |
| EP | 0 878 857 A1 | 11/1998 |
| WO | WO 95/05499 | 2/1995 |

OTHER PUBLICATIONS

Thin Film Technology—Chapter 5—Chemical Methods of Film Formation, pp. 255–287.
D.R. Rolison, K. Kuo, M. Umanda, D. Brundage, and Royce W. Murray, Properties of RuOx Working Electrodes in Nonaqueous Solvents, Kenan Laboratories of Chemistry, University of North Carolina, Chapel Hill, North Carolina.
John M. Blocher, Jr., Vapor–Deposited Materials, edited by Carroll F. Powell, Joseph H. Oxley, John M. Blocher, Jr., Battele Memorial Institute, Columbus, Ohio, sponsored by The Electrochemical Society, Inc., new York, New York.
L.L. Chang, L. Esaki, W.E. Howard, R. Ludeke, and G. Schul, Structures Grown by Molecular Beam Epitaxy, IBM Thomas J. Watson Research Center, Yorktown Heights, New York.
P. Birk and W. Weppner, Electrochemical analysis of thin film electrolytes and electrodes for application in rechargeable all solid state lithium microbatteries, Chair for Sensor and Solid State Ionics, Christian–Albrechts–University, Kaiserstr. 2, D–24143 Kiel, Germany.
T. Brousse, R. Marchand, O Raymond, P Fragnaud, L. Heider and D.M. Schleich, Preparation Of All–Oxide Lithium Ion Microbatteries, ISITEM, Laboratoire de genie des Materiaux, rue Christian Pauc, BP,T. H. Darmstadt, Thin Film Section, Material Science Dept. Petersen Str. 23, Darmstadt, Germany.
Patent Abstracts of Japan, 11017126, Sharp Corp., Deposition Of Ferroelectric Film and Ferroelectric Capacitor Element.
Patent Abstracts of Japan, 09235118, Murata Mfg Co Ltd, Titanium Oxide Film.

* cited by examiner

Primary Examiner—Carol Chaney
Assistant Examiner—Angela J. Martin
(74) Attorney, Agent, or Firm—Michael F. Scalise

(57) ABSTRACT

An electrode component for an electrochemical cell or a capacitor is described wherein the electrode is produced by physical vapor depositing an electrode active material onto a substrate to coat the substrate. The thusly produced electrode is useful as a cathode in a primary electrochemical cell and as a cathode and an anode in a secondary cell, and as an electrode in an electrochemical capacitor and an electrolytic capacitor.

28 Claims, No Drawings

ELECTROCHEMICAL CELL HAVING A PHYSICAL VAPOR DEPOSITED ELECTRODE AND METHOD OF MANUFACTURE

CROSS-REFERENCE TO RELATED APPLICATION

The present application is a divisional of application Ser. No. 09/498,667, filed Feb. 7, 2000, now U.S. Pat. No. 6,332,900 to Muffoletto et al., which claims priority based on provisional application Serial No. 60/118,977, filed Feb. 8, 1999.

BACKGROUND OF THE INVENTION

1. Field of the Invention

The present invention generally relates to the art of electrical energy storage devices and more particularly, to an electrode of an electrochemical cell or capacitor produced by a physical vapor deposition process.

2. Prior Art

Physical vapor plating involves introducing a material of interest into a vacuum and heating to a temperature at which the material reaches its vapor pressure. When molecular rays of the vaporized material attain a sufficient energy such that their mean free path causes them to impinge upon and precipitate onto a substrate, a coating of the material is formed. While physical vapor deposition processes are known in the art, as of yet, they have not been used to deposit an electrode active material onto a substrate to provide an electrode component for an electrochemical cell and to deposit a semiconductive or pseudocapacitive material onto a substrate to provide an electrode component for a capacitor.

SUMMARY OF THE INVENTION

The present invention is directed to a novel and unique application of the physical vapor deposition process. The present process provides a coating of an electrochemically active material on a substrate, preferably a conductive substrate. The thusly produced coated substrate is useful as an electrode, for example, a cathode electrode incorporated into a primary electrochemical cell, and as the anode and/or the cathode of a secondary electrochemical cell. The assembly of the cell incorporating the electrode component made by physical vapor depositing an electrode active material onto a conductive substrate according to the present invention is preferably in the form of a wound element cell. That is, the fabricated cathode together with an anode and a separator are wound together in a "jellyroll" end type configuration or a "wound element cell stack" such that the anode is on the outside of the roll to make electrical contact with the cell case in a case-negative configuration. Other types of cells such as prismatic, bobbin shape and flat cells are also possible with the present invention.

In the case of a capacitor, the present physical vapor deposition process is useful for producing an anode or a cathode in an electrochemical capacitor or the cathode in an electrolytic capacitor. Regardless the type, the capacitor configuration generally includes a substrate of a conductive metal such as titanium or tantalum provided with a semiconductive or a pseudocapacitive oxide coating, nitride coating, carbon nitride coating, or carbide coating.

DETAILED DESCRIPTION OF THE PREFERRED EMBODIMENTS

One embodiment of the present invention is directed to the use of a physically vapor deposited coating of an electrode active material on a conductive substrate to thereby form an electrode component for an electrochemical cell. In one preferred embodiment, the electrode active material is a cathode active material deposited onto a substrate by means of a physical vapor deposition process to form a cathode component for an electrochemical cell. The cathode active material is selected from the group consisting of a metal, a metal oxide, mixed metal oxide, a metal sulfide and a carbonaceous material, and mixtures thereof. Suitable cathode materials include silver vanadium oxide, copper silver vanadium oxide, manganese dioxide, titanium disulfide, copper oxide, cobalt oxide, chromium oxide, copper sulfide, iron sulfide, iron disulfide, carbon and fluorinated carbon. The solid cathode exhibits excellent thermal stability and is generally safer and less reactive than a non-solid cathode.

Preferably, the solid cathode material comprises a mixed metal oxide formed by physical vapor depositing various metal oxides or metal oxide/elemental metal combinations. The materials thereby produced contain metals and oxides of Groups IB, IIB, IIIB, IVB, VB, VIB, VIIB and VIII of the Periodic Table of Elements, which includes the noble metals and/or their oxide compounds.

By way of illustration, and in no way intended to be limiting, an exemplary cathode active material comprises silver vanadium oxide having the general formula $AgxV_2OY$ in any one of its many phases, i.e. β-phase silver vanadium oxide having in the general formula x=0.35 and y=5.18, γ-phase silver vanadium oxide having in the general formula x=0.74 and y=5.37 and ε-phase silver vanadium oxide having in the general formula x=1.0 and y=5.5, and combination and mixtures of phases thereof. Preferably, the cathode active material, whether comprised of silver vanadium oxide or a similarly suitable material, is deposited onto a substrate of titanium, stainless steel, nickel, tantalum, platinum, gold or aluminum by a physical vapor deposition process. The thusly formed exemplary electrode can be incorporated into an alkali metal electrochemical cell, and more particularly, a lithium electrochemical cell.

Another preferred embodiment of the present invention comprises coating an alkalated material onto a conductive substrate of the above described materials by a physical vapor deposition process to provide a cathode for a secondary electrochemical cell. For example, in the case of the alkalated material being a lithiated material suitable materials include oxides, sulfides, selenides and tellurides of such metals as vanadium, titanium, chromium, copper, tin, molybdenum, niobium, iron, nickel, cobalt and manganese. Among the suitable oxides are $LiNiO_2$, $LiMn_2O_4$, $LiCoO_2$, $LiCo_{0.92}Sn_{0.08}O_2$ and $LiCo_{1-x}Ni_xO_2$. The anode for such a secondary electrochemical cell can comprise a particulate carbonaceous composition including carbon together with a filamentary, electrically conductive material such as carbon black. Accordingly, it is further contemplated by the scope of the present invention that particulate carbonaceous compositions are physically vapor deposited onto a conductive substrate for use as an anode component in a secondary cell and as the cathode in a primary electrochemical cell.

Physical vapor deposited coatings rely mostly upon mechanical bonding to the substrate surface. It is, therefore, critical that the electrode substrate be properly prepared to ensure coating quality. It is especially necessary that the surface remain uncontaminated by lubricants from handling equipment or body oils from the hands. Suitable substrate surface preparation techniques include scraping, wire brushing, machining, grit blasting, or by chemical action. It also is recommended that the prepared surface be coated as soon as possible after preparation to prevent the possibility of contamination or surface oxidation.

After substrate surface cleaning, surface roughness is the next most critical factor for properly applying a physical vapor deposited coating of electrode active material. Three methods of roughening the electrode substrate surface are appropriate and they consist of rough threading, grit blasting, and a combination of rough threading, then grit blasting, as are well known to those skilled in the art of chemical vapor deposition techniques.

According to the present invention any one of the previously listed electrode active materials including the enumerated cathode active materials and the lithiated materials is heated in a vacuum to a temperature at which the material reaches its vapor pressure. A suitable vacuum pressure is about $10^{-2}$ torr (about $10^{-5}$ atm) or greater. Under such processing conditions, the vaporized material emits molecular rays in all directions. The vacuum must be great enough that the mean free path of the residual gas molecules is greater than the distance from the material evaporation source to the substrate being coated. Accordingly, the physical vapor deposition process of the present invention requires that the molecular vapor travel from its source to the substrate to form the desired coating without intermediate collision and precipitation.

One of the benefits of the present invention is that electrode plates made by a physical vapor deposition process according to the present invention are thinner than currently available electrodes. This provides for the manufacture of higher surface area cells housed in smaller containers than conventional electrode preparation technology permits. In that respect, the electrode active material can be coated on both sides of the substrate by a physical vapor deposition process to further increase the electrode active surface area. The substrate can also be perforated so that the coatings on both sides of the substrate are in physical contact with each other to lock the electrode active material onto the substrate.

The exemplary cell of the present invention having the cathode component made by the physical vapor deposition of a cathode active material onto a suitable substrate and preferably silver vanadium oxide deposited onto a titanium substrate, further comprises an anode selected from Group Iowa of the Periodic Table of Elements, including lithium, sodium, potassium, etc., and their alloys and intermetallic compounds including, for example Li—Si, Li—B and Li—Si—B alloys and intermetallic compounds. The preferred anode comprises lithium.

The form of the anode may vary, but preferably the anode is a thin metal sheet or foil of the anode metal, pressed or rolled on a metallic anode current collector, i.e., preferably comprising nickel to form an anode component. In the electrochemical cell of the present invention, the anode component has an extended tab or lead of the same material as the anode current collector, i.e., preferably nickel integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface area cell design.

The exemplary cell of the present invention having the cathode component made by physical vapor depositing a cathode active material onto a suitable substrate includes a separator to provide physical separation between the anode and cathode active electrodes. The separator is of electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, glass fiber material, ceramics, a polytetrafluorethylene membrane commercially available under the designations ZITEX (Chemplast Inc.), a polypropylene membrane commercially available under the designation CELGARD (Celanese Plastic Company Inc.) and DEXIGLAS (C.H. Dexter, Div., Dexter Corp.). Other separator materials that are useful with the present invention include woven fabric separators comprising halogenated polymeric fibers, for example of the type described in U.S. Pat. No. 5,415,959 to Pyszczek et al., which is assigned to the assignee of the present invention and incorporated herein be reference. Other suitable halogenated polymeric materials include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company and polyvinylidine fluoride.

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present invention having the cathode component made by physical vapor depositing a cathode active material onto a suitable substrate further includes a nonaqueous, tonically conductive electrolyte activating the anode and the cathode electrodes. The electrolyte serves as a medium for migration of ions between the anode and the cathode during the electrochemical reactions of the cell. The electrochemical reactions at the electrodes involves conversion of the migrating ions into atomic or molecular forms. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, tonically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. In a solid cathode/electrolyte system, the preferred ion-forming alkali metal salt is similar to the alkali metal comprising the anode. Examples of salts useful with the present invention include $LiPF_6$, $LiAsF_6$, $LiSbF_6$, $LiBF_4$, $LiAlCl_4$, $LiNO_3$, $LiGaCl_4$, $LiSO_3F$, $LiB(C_6H_5)_4$, $LiClO_4$, $LiC(SO_2CF_3)_3$, $LiSCN$, $LiO_3SCF_2CF_3$, $LiO_2$, $LiC_6F_5SO_3$, $LiO_2CCF_3$, $LiN(SO_2CF_3)_2$ and $LiCF_3SO_3$, and mixtures thereof.

Low viscosity solvents include tetrahydrofuran (THF), methyl acetate (MA), diglyme, triglyme, tetragylme, dimethyl carbonate (DMC), 1,2-dimethoxyethane (DME), diethyl carbonate, diisopropylether, 1,2-diethoxyethane (DEE), 1-ethoxy,2-methoxyethane (EME), dipropyl carbonate (DPC), ethylmethyl carbonate (EMC), methylpropyl carbonate (MPC) and ethylpropyl carbonate (EPC), and mixtures thereof, and high permittivity solvents include cyclic carbonates, cyclic esters and cyclic amides such as propylene carbonate (PC), butylene carbonate (BC), ethylene carbonate (EC), acetonitrile, dimethyl sulfoxide, dimethyl formamide, dimethyl acetamide, γ-valerolactone, γ-butyrolactone (GBL) and N-methylpyrrolidinone (NMP) and mixtures thereof. In the preferred electrochemical cell comprising the Li/SVO or the Li/CSVO couple, the preferred electrolyte is 1.0M to 1.4M $LiPF_6$ or $LiAsF_6$ in a 50:50 mixture, by volume, of PC and DME.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/terminal pin feedthrough and a hole for electrolyte filling. The glass used is of a corrosion resistant type having from between about 0% to about 50% by weight silicon such as CABAL 12, TA 23 or FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case negative cell which is the preferred construction of the exemplary cell of the present invention. As is well known to those skilled in the art, the exemplary electrochemical system of the present invention can also be constructed in a case positive configuration.

Another embodiment of the present invention is directed to the use of a physically vapor deposited coating of a semiconductive or pseudocapacitive oxide coating, nitride coating, carbon nitride coating, or carbide coating. The coating is deposited on a substrate of a conductive metal such as titanium, molybdenum, tantalum, niobium, cobalt, nickel, stainless steel, tungsten, platinum, palladium, gold, silver, copper, chromium, vanadium, aluminum, zirconium, hafnium, zinc and iron, and mixtures and alloys thereof. The semiconductive or pseudocapacitive material includes an oxide of a first metal, or a precursor thereof, the nitride of the first metal, or a precursor thereof, the carbon nitride of the first metal, or a precursor thereof, and/or the carbide of the first metal, or a precursor thereof, the oxide, nitride, carbon nitride and carbide of the first metal having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, and nickel.

The porous coating may also include a second or more metals. The second metal is in the form of an oxide, a nitride, a carbon nitride or a carbide, or precursors thereof and is not essential to the intended use of the coated foil as a capacitor electrode and the like. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the porous coating includes oxides or ruthenium and tantalum, or precursors thereof.

The thusly fabricated semiconductive or pseudocapacitive coated substrates are useful as an anode or a cathode in an electrochemical capacitor or the cathode in an electrolytic capacitor. For additional disclosure directed to such capacitors, reference is made to U.S. Pat. No. 5,926,362 to Muffoletto et al., which is assigned to the assignee of the present invention and incorporated herein by reference. For a more thorough understanding of the chemical vapor deposition process, reference is made to the book Vapor Deposition, edited by Carroll F. Powell, Joseph H. Oxley and John M. Blocker, Jr. of the Battelle Memorial Institute, Columbus, Ohio, published by John Wiley & Sons, Inc., the disclosure of which is incorporated herein by reference.

It is appreciated that various modifications to the invention concepts described herein may be apparent to those skilled in the art without departing from the spirit and the scope of the present invention defined by the hereinafter appended claims.

What is claimed is:

1. An electrochemical cell having a solid cathode, an anode and an ionically conductive electrolyte activating the anode and the cathode, the improvement in the cathode comprising:
    a) a substrate having opposed first and second major faces; and
    b) a cathode active material provided as a physical vapor deposited layer coated on both of the first and second major faces of the substrate.

2. The electrochemical cell of claim 1 wherein the substrate is flexible.

3. The electrochemical cell of claim 1 wherein the substrate is selected from the group consisting of titanium, stainless steel, nickel, tantalum, platinum, aluminum, gold, and mixtures thereof.

4. The electrochemical cell of claim 1 wherein the cathode active material is selected from the group consisting of a metal, a metal oxide, a mixed metal oxide, a metal sulfide, a carbonaceous material, and mixtures thereof.

5. The electrochemical cell of claim 1 wherein the cathode active material is selected from the group consisting of silver vanadium oxide, copper silver vanadium oxide, manganese dioxide, titanium disulfide, copper oxide, chromium oxide, copper sulfide, iron sulfide, iron disulfide, cobalt oxide, nickel oxide, carbon, fluorinated carbon, and mixtures thereof.

6. The electrochemical cell of claim 1 wherein the anode comprises a Group IA metal.

7. The electrochemical cell of claim 1 wherein the anode comprises lithium.

8. The electrochemical cell of claim 1 wherein the electrolyte solution operatively associated with the anode and the cathode comprises an ion-forming alkali metal salt dissolved in a nonaqueous solvent, wherein the alkali metal of the salt is the same as the alkali metal comprising the anode.

9. The electrochemical cell of claim 8 wherein the alkali metal of the anode comprises lithium and the ion-forming alkali metal salt is selected from the group consisting of $LiPF_6$, $LiAsF_6$, $LiSbF_6$, $LiNO_3$, $LiBF_4$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

10. The electrochemical cell of claim 8 wherein the nonaqueous solvent comprises at least one organic solvent selected from the group consisting of tetrahydrofuran, methyl acetate, diglyme, triglyme, tetraglyme, dimethyl carbonate, 1,2-dimethoxyethane, 1,2-diethoxyethane, 1-ethoxy,2-methoxyethane, diethyl carbonate, acetonitrile, dimethyl sulfoxide, diethyl formamide, dimethyl acetamide, propylene carbonate, ethylene carbonate, γ-valerolactone, γ-butyrolactone, N-methyl-pyrrolidinone, and mixtures thereof.

11. The electrochemical cell of claim 1 wherein a separator is provided between the anode and the cathode to prevent internal short circuit contact between them.

12. The electrochemical cell of claim 1 housed in a conductive casing comprising a material selected from the group consisting of titanium, stainless steel, mild steel, nickel, nickel-plated mild steel and aluminum.

13. The electrochemical cell of claim 1 wherein the anode comprises lithium anode active material in electrical contact with a nickel current collector and the cathode comprises silver vanadium oxide active material in electrical contact with a titanium current collector and wherein the anode and the cathode are activated with the electrolyte solution comprising 1.0M $LiAsF_6$ in a 50:50 mixture, by volume, of propylene carbonate and 1,2-dimethoxyothane.

14. The electrochemical cell of claim 1 wherein the coating of the cathode active material is characterized as a physical vapor deposition product having a thickness or from about 0.001 inches to about 0.4 inches.

15. The electrochemical cell of claim 1 wherein the substrate has been cleaned and provided with a roughened surface texture prior to contact with the coating.

16. The electrochemical cell of claim 1 wherein the substrate is perforated.

17. The electrochemical cell of claim 16 wherein the physical vapor deposited cathode active material provided on both of the first and second major faces of the current collector is locked to each other through the perforations.

18. The electrochemical cell of claim 1 wherein the anode comprises lithium, the cathode comprises silver vanadium oxide as the cathode active material physical vapor deposited onto the substrate comprising titanium and the electrolyte comprises $LiPF_6$ dissolved in an organic solvent.

19. A secondary electrochemical cell, which comprises:
a) a casing;
b) a negative electrode comprising a negative electrode active material which intercalates lithium;
c) a positive electrode comprising a positive electrode active material provided as a physical vapor deposited layer coated on opposed first and second major faces of a substrate, wherein the positive electrode active material is selected from the group consisting of lithiated oxides, lithiated sulfides, lithiated selenides and lithiated tellurides of at least one selected from the group consisting of vanadium, titanium, chromium, copper, tin, molybdenum, niobium, iron, nickel, cobalt, manganese, and mixtures thereof; and
d) an electrolyte activating the negative and positive electrodes housed in the casing.

20. A cathode of an electrochemical cell, which comprises:
a) a substrate of electrically conductive material having opposed first and second major faces; and
b) a cathode active material supported on both of the first and second major faces of the substrate, wherein the layer of cathode active material is characterized as having been deposited onto the substrate by a physical vapor deposition coating process.

21. The cathode of claim 20 wherein the substrate is flexible.

22. The cathode of claim 20 wherein the substrate comprises titanium or aluminum or mixtures thereof.

23. The cathode of claim 20 wherein the cathode active material is selected from the group consisting of a metal, a metal oxide, a mixed metal oxide, a metal sulfide, a carbonaceous material, and mixtures thereof.

24. The cathode of claims 20 wherein the cathode active material is selected from the group consisting of silver vanadium oxide, copper silver vanadium oxide, manganese dioxide, titanium disulfide, copper oxide, chromium oxide, copper sulfide, iron sulfide, iron disulfide, cobalt oxide, nickel oxide, carbon, fluorinated carbon, and mixtures thereof.

25. The cathode of claim 20 wherein the coating of the cathode active material is characterized as a physical vapor deposition product having a thickness of from about 0.001 inches to about 0.4 inches.

26. The cathode of claim 20 wherein the substrate has been cleaned and provided with a roughened surface texture prior to contact with the layer of cathode active material.

27. The cathode of claim 20 wherein the substrate is perforated.

28. The cathode of claim 27 wherein the physical vapor deposited cathode active material provided on both of the first and second major faces of the current collector is locked to each other through the perforations.

* * * * *

UNITED STATES PATENT AND TRADEMARK OFFICE
CERTIFICATE OF CORRECTION

PATENT NO.   : 6,733,926 B2
DATED        : May 11, 2004
INVENTOR(S)  : Barry C. Muffoletto et al.

It is certified that error appears in the above-identified patent and that said Letters Patent is hereby corrected as shown below:

Column 3,
Line 43, "Iowa" should read -- IA --.

Column 7,
Line 30, "1,2-dimethoxyothane" should read -- 1,2-dimethoxyethane --; and
Line 33, "thickness or" should read -- thickness of --.

Signed and Sealed this

Thirtieth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,733,926 B2 Page 1 of 1
DATED : May 11, 2004
INVENTOR(S) : Barry C. Muffoletto et al.

It is certified that error appears in the above-identified patent and that said Letters Patent is hereby corrected as shown below:

Column 3,
Line 43, "Iowa" should read -- IA --.

Signed and Sealed this

Twenty-first Day of December, 2004

JON W. DUDAS
*Director of the United States Patent and Trademark Office*